United States Patent
Spitzer et al.

(10) Patent No.: US 10,718,633 B2
(45) Date of Patent: Jul. 21, 2020

(54) ROTATION SENSOR

(71) Applicant: Infineon Technologies AG, Neubiberg (DE)

(72) Inventors: Dietmar Spitzer, Voelkermarkt (AT); Peter Slama, Klagenfurt (AT); Harald Witschnig, Villach (AT); Leo Aichriedler, Puch (AT); Friedrich Rasbornig, Klagenfurt (AT)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 16/274,940

(22) Filed: Feb. 13, 2019

(65) Prior Publication Data

US 2019/0178682 A1   Jun. 13, 2019

Related U.S. Application Data

(63) Continuation of application No. 14/306,442, filed on Jun. 17, 2014, now Pat. No. 10,222,234.

(51) Int. Cl.
*H02K 11/215* (2016.01)
*G01D 5/14* (2006.01)
(Continued)

(52) U.S. Cl.
CPC .............. *G01D 5/142* (2013.01); *G01B 7/30* (2013.01); *G01D 5/145* (2013.01); *G01D 5/16* (2013.01);
(Continued)

(58) Field of Classification Search
CPC ...... H02K 11/20; H02K 11/21; H02K 11/215; H02K 29/06; H02K 29/08; G01B 7/30;
(Continued)

(56) References Cited

U.S. PATENT DOCUMENTS 5,361,630 A    11/1994   Kowalski
5,705,748 A *  1/1998   Moench ............. G01D 5/24452
                                               324/207.25
(Continued)

FOREIGN PATENT DOCUMENTS

CN    102472607 A    5/2012
DE    19722016 A1    12/1998
(Continued)

OTHER PUBLICATIONS

Non-Final Office Action dated Nov. 9, 2015 U.S. Appl. No. 14/221,570.
(Continued)

*Primary Examiner* — Alfonso Perez Borroto
*Assistant Examiner* — Alexander Moraza
(74) *Attorney, Agent, or Firm* — Design IP

(57) ABSTRACT

A system is provided with a magnetic field sensor being positioned in a magnetic field of a magnet that is coupled to a rotatable driving shaft. The magnetic field sensor is configured to sense a rotation of the magnetic field in response to a rotation of the rotatable driving shaft, and generate an angle sensor signal based on an orientation angle of the magnetic field. The angle sensor signal includes angular values that represent an absolute orientation angle of the rotatable driving shaft. The system includes a memory storing a mapping of values of a patterned signal to the angular values, electronic circuitry configured to generate, based on the angular values and the stored mapping, the patterned signal, and a signal generator circuit configured to generate a signal representing the absolute orientation angle of the rotatable driving shaft based on the angle sensor signal.

24 Claims, 5 Drawing Sheets

(51) Int. Cl.
*G01D 5/246* (2006.01)
*G01D 5/245* (2006.01)
*G01B 7/30* (2006.01)
*G01D 5/16* (2006.01)
G01B 7/315 (2006.01)
H02K 11/21 (2016.01)
H02K 29/06 (2006.01)
H02K 29/08 (2006.01)

(52) U.S. Cl.
CPC ............ *G01D 5/246* (2013.01); *G01D 5/2454* (2013.01); *G01B 7/315* (2013.01); *H02K 11/21* (2016.01); *H02K 11/215* (2016.01); *H02K 29/06* (2013.01); *H02K 29/08* (2013.01)

(58) Field of Classification Search
CPC .......... G01B 7/31; G01B 7/315; G01D 5/142; G01D 5/145; G01D 5/147; G01D 5/16; G01D 5/244; G01D 5/2454; G01D 5/246
USPC .............. 310/156.08, 156.09, 156.11, 68 B; 324/173, 174, 207.2, 207.23, 207.25; 702/145, 146, 147, 148, 150, 151; 73/115.07, 494
See application file for complete search history.

(56) References Cited

U.S. PATENT DOCUMENTS

| | | | |
|---|---|---|---|
| 6,212,783 | B1 | 4/2001 | Ott et al. |
| 6,578,550 | B1* | 6/2003 | Rupp ................. F02D 41/0205 123/406.13 |
| 6,859,002 | B2 | 2/2005 | Desbiolles et al. |
| 7,814,874 | B2 | 10/2010 | Kubani et al. |
| 8,109,136 | B2 | 2/2012 | Moessner |
| 2003/0057941 | A1 | 3/2003 | Collier-Hallman et al. |
| 2004/0235606 | A1 | 11/2004 | Brossard |
| 2005/0217355 | A1 | 10/2005 | Wildman |
| 2007/0244623 | A1* | 10/2007 | Grai ..................... F02D 41/009 701/103 |
| 2007/0245989 | A1 | 10/2007 | Nguyen et al. |
| 2007/0261670 | A1 | 11/2007 | Nguyen et al. |
| 2008/0158039 | A1 | 7/2008 | Kassner |
| 2009/0139478 | A1 | 6/2009 | Dell et al. |
| 2009/0183701 | A1 | 7/2009 | Nguyen et al. |
| 2009/0190283 | A1 | 7/2009 | Hammerschmidt et al. |
| 2009/0309441 | A1* | 12/2009 | Yang ..................... H02K 29/08 310/91 |
| 2011/0073054 | A1 | 3/2011 | Metcalf et al. |
| 2011/0309824 | A1 | 12/2011 | Takahashi et al. |
| 2012/0291545 | A1 | 11/2012 | LeMerise et al. |
| 2013/0238278 | A1* | 9/2013 | Shoemaker .......... G01R 33/075 702/145 |
| 2013/0335070 | A1 | 12/2013 | Abe et al. |
| 2014/0288883 | A1 | 9/2014 | Hammerschmidt et al. |

FOREIGN PATENT DOCUMENTS

| | | |
|---|---|---|
| DE | 19900641 A1 | 1/2000 |
| DE | 10034927 A1 | 2/2002 |
| EP | 2161547 A1 | 3/2010 |
| JP | S57178109 A | 11/1982 |
| JP | H08220121 A | 8/1996 |
| JP | 2000351336 A | 12/2000 |
| JP | 2002372405 A | 12/2002 |
| JP | 2006153802 A | 6/2006 |
| JP | 2006226816 A | 8/2006 |
| JP | 2008026081 A | 2/2008 |
| JP | 2008533497 A | 8/2008 |
| JP | 2008233090 A | 10/2008 |
| JP | 2011257166 A | 12/2011 |
| JP | 2012002716 A | 1/2012 |
| JP | 2013257231 A | 12/2013 |

OTHER PUBLICATIONS

Notice of Allowance dated Jul. 12, 2016 U.S. Appl. No. 14/221,570.
Final Office Action dated Mar. 24, 2016 U.S. Appl. No. 14/221,570.
Witschnig, et al. "A Fully Monolithic Integrated Anisotropic Magnetoresistance Based Angle Sensor for Automotive." Transducers 2013, Barcelona, Spain, 16-20 (Jun. 2013).
U.S. Appl. No. 14/221,570, filed Mar. 21, 2014.

* cited by examiner

ROTATION SENSOR

CROSS-REFERENCE TO RELATED APPLICATIONS

This application is a continuation of U.S. patent application Ser. No. 14/306,442, filed Jun. 17, 2014, which is incorporated by reference as if fully set forth.

FIELD

The present application relates to a sensor device and to a system comprising a sensor device.

BACKGROUND

In various technological fields the rotation of a shaft is sensed. Various control functionality may rely on the sensed rotation of the shaft. E.g., a rotational speed or angular velocity of a shaft of a transmission may be used to control the operation of the transmission. E.g., an angular velocity of a shaft of a wheel axle may be used to monitor friction of the corresponding wheel; this may be useful for antiblocking systems or electronic stability systems in vehicles.

A known way of sensing rotation of the shaft is to place a ferromagnetic toothed wheel on the shaft and use a sensor to detect passing of teeth of the toothed wheel. Typically, the sensor is placed at a distance from the rotational axis of the shaft; often, the sensor is placed radially offset from the ferromagnetic toothed wheel. The output of such sensor typically corresponds to a pattern of pulses in which the frequency of pulses varies according to the speed of rotation. By giving the different teeth of the toothed wheel a size which is distinctive with respect to other teeth of the toothed wheel, it becomes also possible to distinguish between different angular positions in the course of a single rotation of the shaft. It is for example conceivable to make just one of the teeth different from the other, so that an angular position of the toothed wheel may be identified. Without any limitation, more than one of the teeth may be made identifiable whereby more than one of the angular positions are made identifiable.

However, evaluation of the rotation angle using such toothed wheel requires that the shaft is actually rotating. Sometimes, at least one full rotation is needed to determine the absolute orientation. Further, complex algorithms may be needed for accurately estimating the rotation angle from the sensed pattern of pulses. Also, the achievable accuracy may significantly depend on a manufacturing accuracy of the toothed wheel as well as a precision in mounting the sensor relative to the toothed wheel. Still further, the toothed wheels—sometimes also referred to as magnetic encoder wheels—may require significant space and may be comparably expensive.

Accordingly there is a need for techniques which allow for sensing rotation of a shaft in an efficient and accurate manner.

SUMMARY

According to an embodiment, a sensor device is provided. The sensor device may comprise a magnetic field sensitive element to be positioned in a magnetic field of a magnet. The magnet may be positioned on an end face of a shaft. The magnetic field sensitive element may be configured to sense an orientation angle of the magnetic field in the range between 0° and 360°. The shaft may be one of a shaft of a transmission of a vehicle or a shaft of a brushless DC motor or a shaft of a wheel axle of a vehicle.

According to a further embodiment, a system is provided. The system may comprise a shaft of a transmission of a vehicle and a magnet positioned on an end face of the shaft. The system may further comprise a magnetic field sensitive element positioned in the magnetic field of the magnet. The magnetic field sensitive element may be configured to sense an orientation angle of the magnetic field in the range between 0° and 360°.

According to a further embodiment, a system is provided which may comprise a shaft of a brushless direct current (DC) motor and a magnet positioned on an end face of the shaft. The system may further comprise a magnetic field sensitive element positioned in a magnetic field of the magnet. The magnetic field sensitive element may be configured to sense an orientation angle of the magnetic field in the range between 0° and 360°.

In a further embodiment, a system is provided which may comprise a shaft of a wheel axle of a vehicle. The system may comprise a magnet positioned on an end face of the shaft and a magnetic field sensitive element positioned in a magnetic field of the magnet. The magnetic field sensitive element may be configured to sense an orientation angle of the magnetic field in a range between 0° and 360°.

According to further embodiments of the disclosure, other devices, systems, or methods may be provided. Such embodiments will be apparent from the following detailed description in connection with the accompanying drawings.

DETAILED DESCRIPTION

Figure 1:
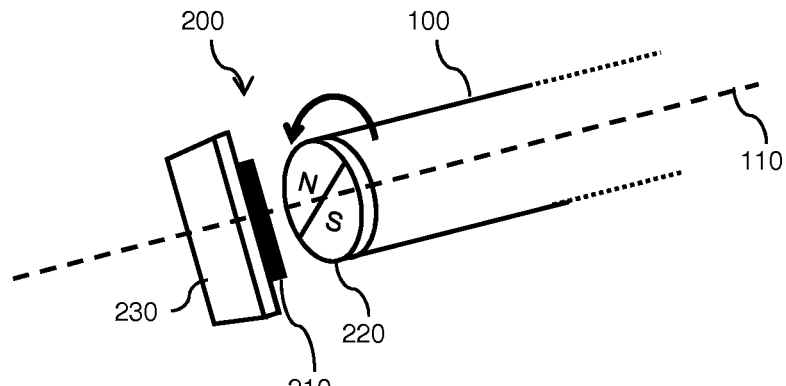
FIG. 1 schematically illustrates a sensor device according to an embodiment of the disclosure.

In the following, various embodiments will be described in detail with reference to the accompanying drawings. It should be noted that these embodiments serve only as examples and are not to be construed as limiting. E.g., while embodiments with a plurality of features, other embodiments may comprise less features and/or alternative features. Furthermore, features from different embodiments may be combined with each other unless specifically noted otherwise.

Embodiments as illustrated in the following relate to techniques of sensing the rotation of a shaft, in particular of a shaft of a transmission of a vehicle, of a shaft of a brushless DC motor, and of a shaft of a wheel axle of a vehicle. The illustrated embodiments cover corresponding sensor devices, systems, and methods.

In the illustrated embodiments, a magnetic field sensitive element is utilized which is positioned in a magnetic field of a magnet. The magnet is positioned on an end face of the shaft. The magnetic field sensitive element is configured to sense an orientation angle of the magnetic field in the range between 0° and 360°. From this angle, it may be possible to unambiguously determine the orientation of the magnetic field.

The magnetic field sensitive element may without any limitation be based on a magnetoresistive effect, such as the Giant Magnetoresistance (GMR) effect, Anisotropic Magnetoresistance (AMR) effect, Tunnel Magnetoresistance (TMR) effect, or Hall effect. An example embodiment of the magnetic field sensitive element could be based on two GMR devices with two different maximum sensitivity directions in a plane which is parallel to the end face of the shaft and perpendicular to a longitudinal direction and rotation axis of the shaft. Such a magnetic field sensitive element may allow for accurate detection of the orientation angle of the magnetic field of a magnet having a magnetization which is orientated perpendicular to the rotation axis of the shaft. In particular, such magnetic field sensitive element may be used in a compass like manner to sense the orientation of the magnetic field of the magnet rotating together with the shaft.

Further, the illustrated embodiments may utilize a stored mapping of pulse edges to orientation angles. In some embodiments, the mapping can be configurable, e.g., by programming the memory. Depending on this mapping and the orientation angle of the magnetic field as sensed by the magnetic field sensitive element, a first signal is generated which includes a pattern of pulses with rising and falling pulse edges. Within the first signal the rising and/or falling edges may be mapped to predefined orientation angles as sensed by the magnetic field sensitive element. The first signal may be used to emulate a pulse pattern as generated by a sensor assembly which is based on an asymmetric toothed wheel, as explained before. Such a form of the first thereby achieving compatibility to existing sensor devices relying on such asymmetric toothed wheels.

In addition, the sensed angular orientation may be used to generate a second signal which represents a rotation angle of the shaft in the range between 0° and 360°. In the latter case, the rotation angle may be represented by a digital value, an analog value, or a pulse width modulated signal. The pulse width modulated signal may, in other words, correspond to a pulse width modulated value. Different modes of operation may be provided for outputting either the first signal or the second signal. E.g., a sensor device may be provided with a first mode of operation in which the sensor device outputs the first signal and a second mode of operation in which the sensor device outputs the second signal instead of the first signal. Likewise, the sensor may output both of the first signal and the second signal in yet another mode of operation.

In some embodiments, the orientation of the magnetic field as sensed by the magnetic field sensitive element may also be used as a basis for generating further signals. E.g., depending on the sensed orientation angle, a further signal may be generated representing an angular speed of the shaft. The angular speed may without any limitation be represented by a digital value, an analog value, or a pulse width modulated signal. The further signal may have a predefined periodicity per revolution of the shaft. In other words, a repetition of basic building blocks—such as pulses or half-waves or full waves—of the signal may amount to a certain predefined number. As a non-limiting example, there may be a number of ten duty cycles per revolution. The predefined periodicity may allow emulating the output of a conventional sensor device operating based on a toothed wheel. The predefined periodicity may correspond to a number of teeth of the emulated toothed wheel.

The above embodiments will now be further explained with reference to the drawings.

FIG. 1 schematically illustrates a sensor device 200 according to an embodiment. The sensor device 200 is configured to sense rotation of a shaft 100, i.e., orientation and/or angular speed. Accordingly, the sensor device 200 in the following will also be referred to as a rotation sensor.

The shaft may be one of a shaft of transmission of a vehicle or a shaft of a brushless DC motor or a shaft of a wheel axle of a vehicle.

In the illustrated embodiment, the sensor device 200 includes a magnetic field sensitive element 210, in the following also referred to as sensor element, and a magnet 220. Further an output circuitry 230 is provided in the illustrated embodiment. As illustrated, the magnet 220 may be a disc-shaped dipole magnet mounted on an end face of the shaft 100. The magnetization of the magnet 220 (from south pole "S" to north pole "N") is oriented perpendicularly to the longitudinal rotation axis 110 of the shaft 100. The magnetization may correspond to the internally acting magnetic field. A border between North and South pole of the magnet 220 may be oriented perpendicular to the magnetization. Accordingly, when the shaft rotates as indicated by the arrow, the orientation of the magnetic field of the magnet 220 changes in an anti-clockwise manner around the longitudinal rotation axis 110 of the shaft 100 (viewed in FIG. 1 from the distal end of the axis towards the magnet).

As mentioned above, the sensor element 210 may, e.g., be based on two GMR devices each having a different maximum sensitivity direction in a plane which is perpendicular to the longitudinal rotation axis 110 of the shaft 100, thereby allowing for sensing the absolute angle of the orientation of the magnetic field in a range from 0° to 360°.

The geometrical shape and the magnetic configuration of the magnet 220 are not particularly limited. As mentioned above, in the scenario of FIG. 1, a disc-shaped element forming a magnetic dipole is shown. One half of the disc forms the magnetic north pole N and the other half of the disc forms the magnetic south pole S. The magnetic axis, i.e., the geometrical connection between north pole S and south pole S, is oriented perpendicular to the axis of the shaft. It is also possible that magnetic multi-pole elements are used which comprise a plurality of north poles and corresponding south poles. This may increase a sensitivity and accuracy in the sensing of the orientation angle of the magnetic field. In such a scenario, the rotation sensor is typically preconfigured with information on a spatial shape of the magnetic field generated by the magnet 220. In one embodiment, it may be desirable to use a flat element which radially extends with respect to the axis of the shaft 100. This may allow sensing of the orientation even in situations where not much space is available. However, it is also possible that an element with a considerable thickness compared to its radial dimension is employed. As shown in the scenario of FIG. 1, a radial dimension of the magnet may be in the order of the radial dimension of the shaft 100. However, in general it is also possible that the radial dimension of magnet 200 is considerably larger or smaller than the radial dimension of the shaft 100. E.g., in a scenario, a magnetic pill may be used as the magnet 200. The magnetic pill may be a substantially elongate element where the magnetic poles are situated on opposing ends thereof. Elongate may refer to a substantially 1d extended element. E.g., the magnetic pill may be diametrically magnetized.

As can be seen from FIG. 1, the sensor element 210 is positioned at an axial extension of the shaft 100 (as indicated by the dashed line in FIG. 1) and is offset by a gap with respect to the magnet 220. In particular, the sensor element 210 may be stationary while the shaft 100 rotates, as illustrated in FIG. 1.

Further, the sensor device 200 may include the electronic output circuitry 230 which is configured to generate various kinds of output signals from the orientation angle of the magnetic field as sensed by the sensor element 210. The sensor element 210 and the output circuitry 230 may be arranged on the same semiconductor chip or in the same chip package. Functionalities of the output circuitry 230 are further illustrated by the block diagram of FIG. 2.

Figure 2:
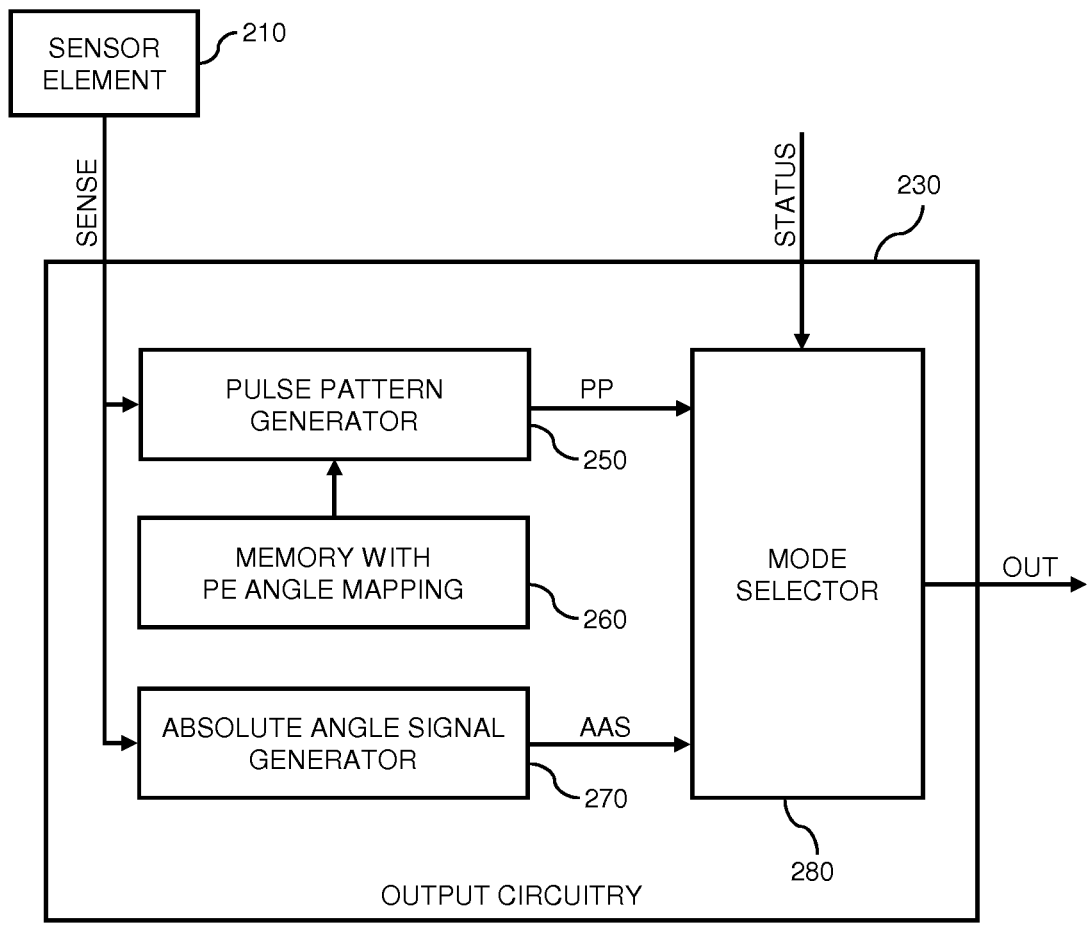
FIG. 2 shows a block diagram for schematically illustrating functionalities of the sensor device.

As illustrated in FIG. 2, the output circuitry 230 may include a pulse pattern generator 250 and a memory 260. The pulse pattern generator 250 is configured to generate a signal PP which includes a pattern of pulses. This is accomplished depending on the sensed orientation angle of the magnetic field, in FIG. 2 represented by signal SENSE, and a pulse edge (PE) angle mapping as stored in the memory 260. The memory 260 may for example be implemented by a suitable type of semiconductor memory, such as a Read Only Memory (ROM), a Programmable ROM (PROM), an Erasable PROM (EPROM), or a flash memory. An embodiment of the memory 260 using PROM, EPROM, or flash memory may be used to allow configuration or even reconfiguration of the PE angle mapping stored in the memory 260.

In the illustrated embodiment, the PE angle mapping stored in the memory 260 defines, for each pulse of the pulse pattern, an orientation angle associated with a rising edge of the pulse and an orientation angle associated with a falling edge of the pulse. Accordingly, the pulse pattern generator 250 may operate by comparing the sensed orientation to the orientation angles in the mapping and, if the sensed orientation angle passes an orientation angle corresponding to a rising edge, switching the value of the signal PP to a high value or, if the sensed orientation angle passes an orientation angle corresponding to a falling edge, switching the value of the signal PP to a low value. In this way, various kinds of pulse patterns may be generated, including highly asymmetric pulse patterns in which, over the course of a complete rotation of the shaft 100, each pulse differs from the other pulses with respect to its duty cycle.

As further illustrated, the output circuitry 230 may also include an absolute angle signal generator 270 which is configured to generate a signal AAS which represents the absolute orientation angle of the shaft 100 in the range from 0° to 360°. The signal AAS may, for example, represent the absolute orientation angle of the shaft 100 as an analog value. Further, the signal AAS may encode the absolute orientation angle of the shaft 100 as a digital value or a pulse width modulated signal. The absolute angle signal generator 270 may derive the absolute orientation angle of the shaft 100 from the orientation angle of the magnetic field as sensed by the sensor element by, e.g., adding an offset which takes into account the mounting orientation of the magnet 220 on the shaft 100 and/or any further reference offset. The absolute angle signal generator 270 may also perform signal conversion, e.g., from an analog representation of the signal SENSE to a digital or pulse width modulated representation of the signal AAS, as non-limiting examples. Alternatively or additionally, the pulse pattern generator 250 may perform the signal conversion.

In some embodiments, the absolute angle signal generator 270 may also be configured to generate one or more further signals from the orientation angle sensed by the sensor element 210. E.g., the absolute angle signal generator 270 may generate a signal representing the angular speed of the shaft 100, e.g., by calculating the time derivative of the absolute orientation angle of the shaft 100. Optionally, a direction of the rotation may be encoded. In order to emulate the output signal obtained with the conventional sensor element interacting with a toothed wheel, it is, e.g., possible that the absolute angle signal generator 270 outputs the signal representing the angular speed of the shaft 100 such that it has a predefined number of periods per revolution of the shaft, as a non-limiting example 12 or 20 periods. Such a signal may be suited to emulate the signal obtained with a conventional absolute angle signal generator interacting with a toothed wheel having a corresponding number of teeth.

As further illustrated, the output circuitry 230 of FIG. 2 may include a mode selector 280. The mode selector 280 may be used for selecting different operating modes of the output circuitry 230. In particular, the mode selector 280 may be used for selecting a first operating mode, in which the output circuitry 230 outputs the signal PP as its output signal OUT. The mode selector 280 may further be used for selecting a second operating mode, in which the output circuitry may output the signal AAS as its output signal OUT. Optionally, the mode selector 280 may be used for selecting a third operating mode, in which the output circuitry 230 outputs the further signal which is indicative of the rotational speed.

Various decision criteria used by the mode selector 280 in order to select a particular operating mode are conceivable. E.g., in a start-up phase of the rotation of the shaft, the mode selector 280 may select the second operating mode, thereby providing useful information on the rotation angle of the shaft 100 even when the shaft is substantially static, which means that the signal PP may not yet have a sufficient number of pulses for a relation of the rotation angle. After a certain number of rotations of the shaft 100, e.g., after one complete rotation, or when an angular speed of the shaft 100 exceeds a threshold value, the mode selector 280 may select the first operation mode, in which the output signal OUT may be generated to emulate an output signal as typically provided by conventional toothed wheel-based rotation sensors.

It is also possible that the output circuitry 230 outputs a plurality of signals. For example, the signal AAS may be output and the further signal may be output in one and the same operation mode. Then it may be possible to derive, both, the orientation as well as the rotational speed.

Figure 3A:
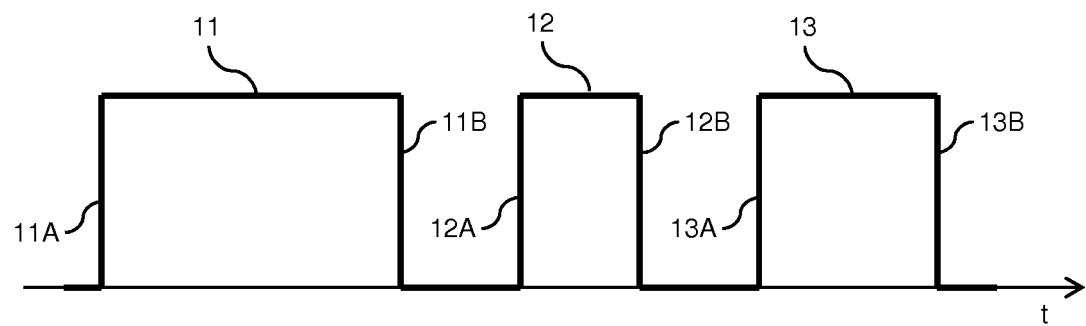
FIG. 3A shows an example pulse pattern in a signal generated by a sensor device according to an embodiment.
Figure 3B:
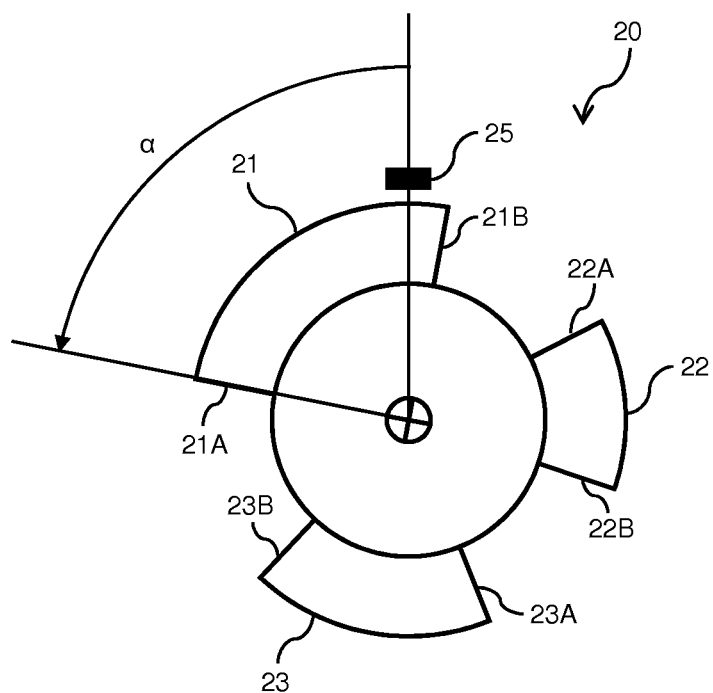
FIG. 3B schematically illustrates a ferromagnetic toothed wheel in combination with a sensor, the ferromagnetic toothed wheel having a profile substantially corresponding to the pulse pattern of FIG. 3A.

An example pulse pattern as included in the signal PP is illustrated in FIG. 3A. This pulse pattern is assumed to emulate an output signal of a rotation sensor 25 arranged in the magnetic field of a toothed wheel 20 as schematically illustrated in FIG. 3B. In the illustrated example, the pulse pattern consists of three pulses 11, 12, 13, having a different duty cycle each. Each pulse 11, 12, 13 corresponds to a particular tooth 21, 22, 23 of a toothed wheel 20 used with rotation sensor 25. In the given example, the pulse 11 corresponds to tooth 21 of the toothed wheel 20, the pulse 12 corresponds to tooth 22 of the toothed wheel 20, and the pulse 13 corresponds to tooth 23 of the toothed wheel 20.

On the toothed wheel 20 shown in FIG. 3B the teeth 21, 22, 23 each have two edges 21A, 21B, 22A, 22B, and 23A, 23B extending in a substantially radial direction with regards to the axis. Each pair of edges 21A, 21B, 22A, 22B, and 23A, 23B defines an angular position and circumferential extension of the respective tooth 21, 22, 23. If during rotation of the toothed wheel 20 the rotation angle α increases, the teeth 21, 22, 23 subsequently pass a sensor 25. E.g., the sensor 25 can be a Hall sensor, a GMR sensor, a TMR sensor, or AMR sensor and at least the teeth 21, 22, 23 of the toothed wheel 20 may be formed of a ferromagnetic material. The pulse pattern of a typical output signal of such a system setup is emulated by the signal PP, as illustrated in FIG. 3A. In the illustrated example, the pulse pattern of FIG. 3A has a rising pulse edge 11A of the pulse 11 at a time when the edge 21A of the tooth 21 would pass the sensor 25, and has a falling pulse edge 11B at a time when the edge 21B of the pulse 21 would pass the sensor 25. Similarly, the pulse pattern of FIG. 3A has a rising pulse edge 12A of the pulse 12 at a time when the edge 22A of the tooth 22 would pass the sensor 25, and has a falling pulse edge 12B at a time when the edge 22B of the pulse 22 would pass the sensor 25. Similarly, the pulse pattern of FIG. 3A has a rising pulse edge 13A of the pulse 13 at a time when the edge 23A of the tooth 23 would pass the sensor 25, and has a falling pulse edge 13B at a time when the edge 23B of the pulse 23 would pass the sensor 25.

The output circuitry 230 of the illustrated embodiment may achieve emulation by suitably configuring the PE angle mapping stored in the memory 260. E.g., when assuming that the edge 21A of the tooth 21 is located at an angular position of 0°, the PE angle mapping may assign a rising pulse edge 11A to the orientation angle of 0°. Similarly, if the edge 21B of the tooth 21 is located at an angular position of 90°, the PE angle mapping may assign falling pulse edge 11B to the orientation angle of 90°. For the other teeth 22, 23 corresponding assignments may be done depending on the angular position and circumferential extension of the teeth 22, 23. In such an assignment of rising and falling pulse edges, also an offset between the orientation angle of the magnetic field and the rotation angle of the shaft 100 may be taken into account. The offset may relate to a difference of the orientation angle and the rotation angle. The offset may be taken into account by a predefined reference angle used for calibration of the PE angle mapping.

It is to be understood that the pulse pattern of FIG. 3A would be repeated with each revolution of the shaft 100. Further, the pulse widths and pauses in the pulse pattern would vary according to the rotation speed of the shaft 100. E.g., the ratio of pulses to pauses per revolution may remain constant.

Figure 4:
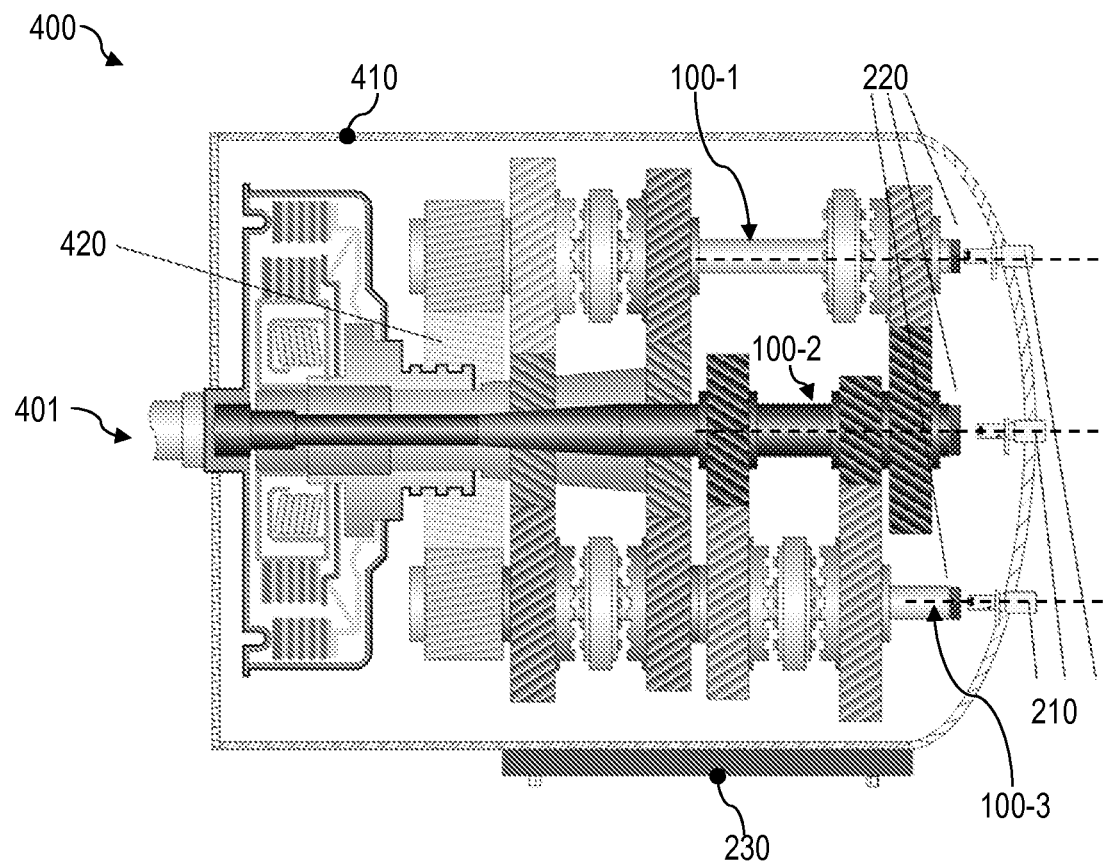
FIG. 4 schematically illustrates a system according to an embodiment comprising a sensor device and a shaft of a transmission of a vehicle.

In FIG. 4, a transmission 400 in the form of a gear box is shown. An input shaft 401 is driven by an engine of a vehicle (not shown in FIG. 4). A transmission output wheel 420 is shown. There are three shafts 100-1, 100-2, 100-3 of the transmission 400. Each one of the three shafts 100-1, 100-2, 100-3 is equipped with a magnet 220 on an end face thereof. A housing 410 rotatably houses the shaft 100-1, 100-2, 100-3. At least parts of the shaft rotate within the housing. In other words, the housing 410 does not rotate together with the shafts 100-1, 100-2, 100-3, it rather encloses an end portion of the shafts 100-1, 100-2, 100-3. A respective bearing may be provided. The magnetic sensor elements 210 associated with the respective three magnets 220 are attached to the housing 410. While FIG. 4 shows the magnet 220 on an end face of each one of the shafts 100-1, 100-2, 100-3, the magnet may without limitation be provided on only some of the shafts. In particular, the sensor elements 210 are positioned at an axial extension of the respective shaft 100-1, 100-2, 100-3 (illustrated in FIG. 4 by the dashed lines) offset by a gap with respect to the magnet 220. It is possible that the sensor elements 210 are displaced against the axial extension of the respective shaft 100-1, 100-2, 100-3. By techniques as mentioned above, it is possible to determine the orientation and/or the rotational speed of the shafts 100-1, 100-2, 100-3.

Figure 5:
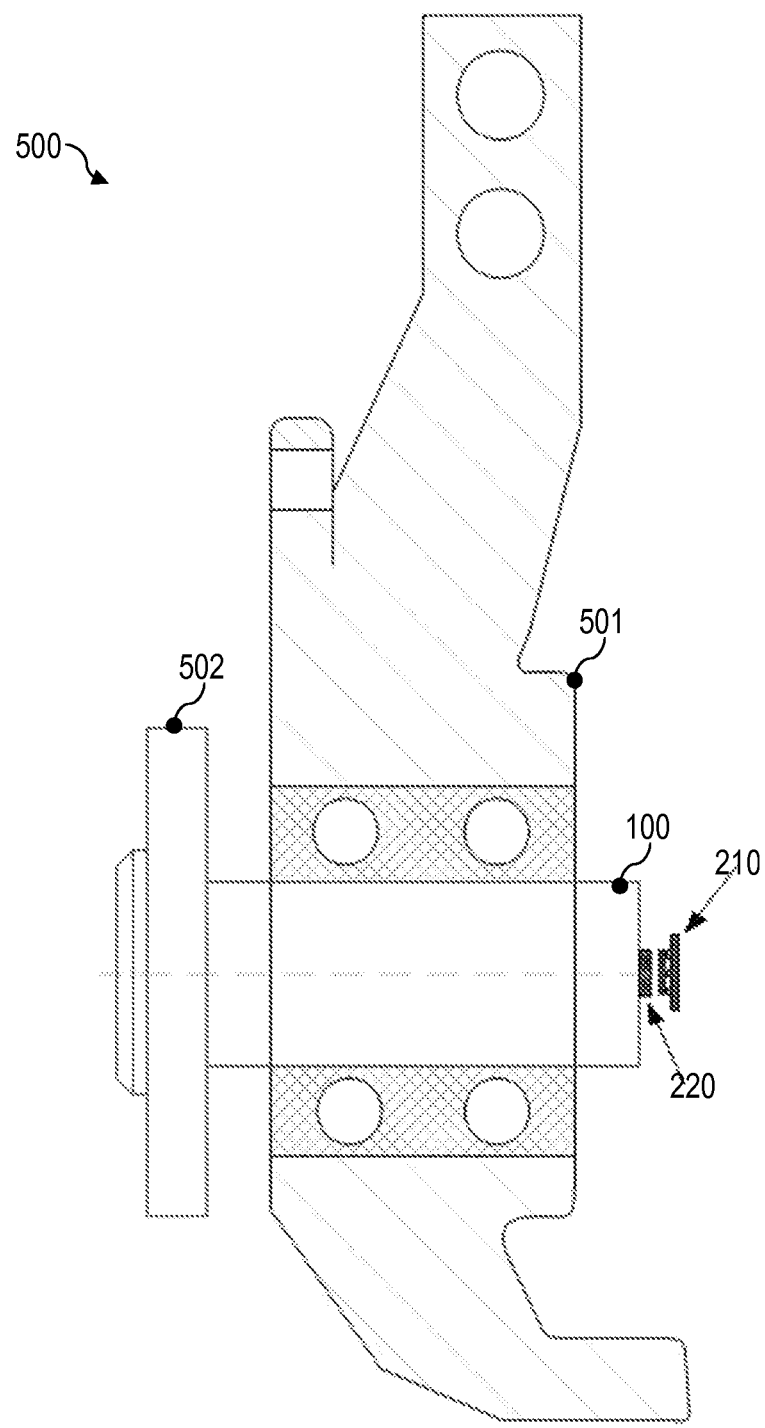
FIG. 5 schematically illustrates a system according to an embodiment where a sensor device and a shaft of a wheel axle of a vehicle are provided.

In FIG. 5, a system 500 comprising a shaft 100 of a wheel axle is shown. An end face of the shaft 100 is provided with the magnet 220. The end face of the shaft 100 is opposite to a wheel bearing 502 of the wheel axle. The shaft 100 is rotatably connected to an axle carrier 501 between the end face and the wheel bearing 502. Further illustrated in FIG. 5 is the sensor element 210 which is positioned at an axial extension of the shaft 100 and offset by a gap with respect to the magnet 200. The sensor element 210 does not rotate together with the shaft 100. By the techniques as mentioned above, it is possible to determine the orientation and/or the rotational speed of the shaft 100.

Figure 6:
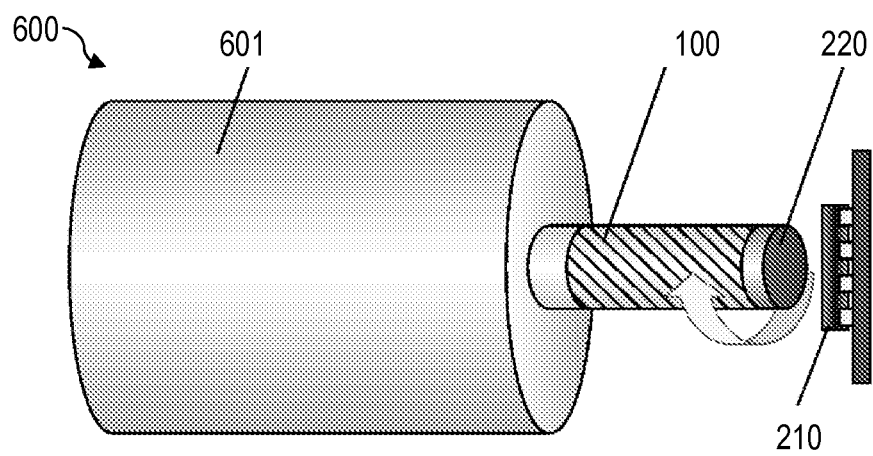
FIG. 6 schematically illustrates a system according to an embodiment where a sensor device and a shaft of a brushless DC motor are provided.

Turning to FIG. 6, a brushless DC motor unit or assembly 600 is shown. A motor 601 of the assembly may be attached to the shaft 100. At the end face of the shaft, the magnet 220 is positioned. At an axial extension of the shaft 100 and offset by a gap, the sensor element 210 is positioned. By techniques as mentioned above, it is possible to determine the orientation and/or the rotational speed of the shaft 100.

A controller (not shown in FIG. 6) of the brushless DC motor assembly 600 may continuously switch a phase of electrical windings to keep the motor 601 turning. The switching may occurs in response to the orientation of the shaft 100. By determining the orientation angle of the magnetic field in the range of between 0° and 360° employing the sensor element 210, it becomes possible to determine the orientation angle of the shaft 100. This allows for accurate control of the brushless DC motor 601.

As can be seen from the above, the techniques may reduce complexity, required space, and costs when sensing the orientation of shafts 100, 100-1, 100-2, 100-3. Significantly less space than in conventional transmissions may be required in the scenario of FIG. 4 with the magnets 220 placed on one or more end faces of the shafts 100-1-100-3 of the transmission 400. In particular, when employing toothed wheels, it may be necessary to occupy additional space on the shafts 100-1-100-3 to mount the latter. Typically, the toothed wheels (as shown in FIG. 3B) are limited to a minimum diameter of approximately 7 cm. Often, when employing conventional magnetic field sensors in the proximity of such toothed wheels, large sensor towers are required in order to bring the magnetic field sensors closer to the toothed wheel. Extra costs are generated and a system complexity typically increases. Further, there is a constant demand for downsizing transmissions 400. When employing a system as mentioned above, both, complexity and required space may be reduced.

Further, in the scenario of FIG. 5, with the magnet 220 being attached to an end face of the shaft 100 of the wheel axle, significantly reduced space and costs are achieved when compared to conventional solutions. In particular, in conventional systems, a toothed wheel is often arranged close to the wheel bearing 502. Typically, this affects overall system dimensions such as increased construction space. Consequently, complexity and the costs are further increased. The respective sensor in conventional systems is further located close to the braking system including the brake disc, brake caliper, and brake shoes; this often results in a high temperature environment. The accuracy of the sensing of the orientation may degrade and an increased wear out of the electronics may result.

It is to be understood that the above-described concepts and embodiments are susceptible to various modifications. For example, various pulse patterns corresponding to various kinds of toothed wheel profiles could be emulated. Such emulation may also be extended to not only emulate the angular position and extension of teeth, but could also emulate further characteristics of the tooth profile, such as a radial dimension of the tooth or slope of the tooth edges. Further, the rotation sensor could use other kinds of sensing devices or other types of magnets, such as more complex multi-pole magnets.

What is claimed is:

1. A system, comprising:
a rotatable driving shaft extending along a rotation axis, wherein the rotatable driving shaft is one of a shaft of a transmission of a vehicle, a shaft of a brushless DC motor, or a shaft of a wheel axle of a vehicle;
a magnet coupled to the rotatable driving shaft, the magnet module configured to generate a magnetic field that rotates as the rotatable driving shaft rotates about the rotation axis;
a magnetic field sensor positioned in the magnetic field and configured to sense a rotation of the magnetic field in response to a rotation of the rotatable driving shaft, wherein the magnetic field sensor is configured to generate an angle sensor signal based on an orientation angle of the magnetic field, the angle sensor signal comprising angular values that represent an absolute orientation angle of the rotatable driving shaft;
a memory storing a mapping of patterned signal values to a plurality of angular values;
electronic circuitry configured to generate, based on the angular values and the stored mapping, a patterned signal;
a signal generator circuit configured to generate a signal representing the absolute orientation angle of the rotatable driving shaft based on the angle sensor signal, wherein the signal representing the absolute orientation angle and the patterned signal are generated independently of each other from the angle sensor signal; and
a mode selection circuit configured to receive the patterned signal as a first signal and the signal representing the absolute orientation angle of the shaft as a second signal, and output the first signal or the second signal based on a mode selection signal.

2. The system of claim 1, wherein:
the signal generator circuit is configured to generate a signal representing an angular speed of the rotatable driving shaft based on the angular values; and
the mode selection circuit configured to receive the signal representing the angular speed of the rotatable driving shaft as a third signal, and output the first signal, the second signal, or the third signal based on the mode selection signal.

3. The system of claim 1, wherein the magnetic field sensor is rotationally fixed with respect to the magnet.

4. The system of claim 1, wherein the magnetic field sensor is configured to unambiguously sense the orientation angle of the magnetic field in the range from 0° to 360°.

5. The system of claim 1, wherein the electronic circuitry is further configured to generate, depending on the sensed orientation angle, a further signal that represents a rotation angle of the rotatable driving shaft in the range from 0° to 360°.

6. The system of claim 1, wherein:
the electronic circuitry is configured to receive the angle sensor signal and generate the patterned signal based on the angular values of the angle sensor signal received at the electronic circuitry; and
the signal generator circuit is configured to receive the angle sensor signal and generate the signal representing the absolute orientation angle of the rotatable driving shaft based on the angle sensor signal received at the signal generator circuit.

7. The system of claim 6, wherein:
the signal generator circuit is configured to receive the angle sensor signal and generate the signal representing the angular speed of the rotatable driving shaft based on the angular values of the angle sensor signal received at the signal generator circuit.

8. The system of claim 7, wherein the signal representing the angular speed of the rotatable driving shaft and the patterned signal are generated independently of each other.

9. The system of claim 6, wherein the patterned signal comprises a plurality of pulses, wherein each pulse has a different duty cycle based on the stored mapping.

10. A system, comprising:
a rotatable driving shaft of a transmission of a vehicle, wherein the rotatable driving shaft extends along a rotation axis;
a magnet coupled to the rotatable driving shaft, the magnet module configured to generate a magnetic field that rotates as the rotatable driving shaft rotates about the rotation axis;
a magnetic field sensor positioned in the magnetic field and configured to sense a rotation of the magnetic field in response to a rotation of the rotatable driving shaft, wherein the magnetic field sensor is configured to generate an angle sensor signal based on an orientation angle of the magnetic field, the angle sensor signal comprising angular values that represent an absolute orientation angle of the rotatable driving shaft;
a memory storing a mapping of patterned signal values to a plurality of angular values;
electronic circuitry configured to generate, based on the angular values and the stored mapping, a patterned signal;
a signal generator circuit configured to generate a signal representing the absolute orientation angle of the rotatable driving shaft based on the angle sensor signal, wherein the signal representing the absolute orientation angle and the patterned signal are generated independently of each other from the angle sensor signal; and
a mode selection circuit configured to receive the patterned signal as a first signal and the signal representing the absolute orientation angle of the shaft as a second signal, and output the first signal or the second signal based on a mode selection signal.

11. The system of claim 10, wherein:
the signal generator circuit is configured to generate a signal representing an angular speed of the rotatable driving shaft based on the angular values; and
the mode selection circuit configured to receive the signal representing the angular speed of the rotatable driving shaft as a third signal, and output the first signal, the second signal, or the third signal based on the mode selection signal.

12. The system of claim 10, wherein the magnetic field sensor is configured to unambiguously sense the orientation angle of the magnetic field in the range from 0° to 360°.

13. The system of claim 10, wherein the electronic circuitry is further configured to generate, depending on the sensed orientation angle, a further signal which represents a rotation angle of the rotatable driving shaft in the range from 0° to 360°.

14. The system of claim 10, wherein the magnet is selected from the group comprising:
- a diametrically magnetized magnetic pill,
- a flat element radially extending with respect to an axis of the rotatable driving shaft, and
- a disc-shaped element forming a magnetic dipole, wherein one half of the disc forms the magnetic north pole and the other half of the disc forms the magnetic south pole.

15. A system, comprising:
- a rotatable driving shaft of a brushless DC motor, wherein the rotatable driving shaft extends along a rotation axis;
- a magnet coupled to the rotatable driving shaft, the magnet module configured to generate a magnetic field that rotates as the rotatable driving shaft rotates about the rotation axis;
- a magnetic field sensor positioned in the magnetic field and configured to sense a rotation of the magnetic field in response to a rotation of the rotatable driving shaft, wherein the magnetic field sensor is configured to generate an angle sensor signal based on an orientation angle of the magnetic field, the angle sensor signal comprising angular values that represent an absolute orientation angle of the rotatable driving shaft;
- a memory storing a mapping of patterned signal values to a plurality of angular values;
- electronic circuitry configured to generate, based on the angular values and the stored mapping, a patterned signal;
- a signal generator circuit configured to generate a signal representing the absolute orientation angle of the rotatable driving shaft based on the angle sensor signal, wherein the signal representing the absolute orientation angle and the patterned signal are generated independently of each other from the angle sensor signal; and
- a mode selection circuit configured to receive the patterned signal as a first signal and the signal representing the absolute orientation angle of the shaft as a second signal, and output the first signal or the second signal based on a mode selection signal.

16. The system of claim 15, wherein:
the signal generator circuit is configured to generate a signal representing an angular speed of the rotatable driving shaft based on the angular values; and
the mode selection circuit configured to receive the signal representing the angular speed of the rotatable driving shaft as a third signal, and output the first signal, the second signal, or the third signal based on the mode selection signal.

17. The system of claim 15, wherein the magnetic field sensor is configured to unambiguously sense the orientation angle of the magnetic field in the range from 0° to 360°.

18. The system of claim 15, wherein the electronic circuitry is further configured to generate, depending on the sensed orientation angle, a further signal which represents a rotation angle of the rotatable driving shaft in the range from 0° to 360°.

19. The system of claim 15, wherein the magnet is selected from the group comprising:
- a diametrically magnetized magnetic pill,
- a flat element radially extending with respect to an axis of the rotatable driving shaft, and
- a disc-shaped element forming a magnetic dipole, wherein one half of the disc forms the magnetic north pole and the other half of the disc forms the magnetic south pole.

20. A system, comprising:
- a rotatable driving shaft of a wheel axle of a vehicle, wherein the rotatable driving shaft extends along a rotation axis;
- a magnet coupled to the rotatable driving shaft, the magnet module configured to generate a magnetic field that rotates as the rotatable driving shaft rotates about the rotation axis;
- a magnetic field sensor positioned in the magnetic field and configured to sense a rotation of the magnetic field in response to a rotation of the rotatable driving shaft, wherein the magnetic field sensor is configured to generate an angle sensor signal based on an orientation angle of the magnetic field, the angle sensor signal comprising angular values that represent an absolute orientation angle of the rotatable driving shaft;
- a memory storing a mapping of patterned signal values to a plurality of angular values;
- electronic circuitry configured to generate, based on the angular values and the stored mapping, a patterned signal;
- a signal generator circuit configured to generate a signal representing the absolute orientation angle of the rotatable driving shaft based on the angle sensor signal, wherein the signal representing the absolute orientation angle and the patterned signal are generated independently of each other from the angle sensor signal; and
- a mode selection circuit configured to receive the patterned signal as a first signal and the signal representing the absolute orientation angle of the shaft as a second signal, and output the first signal or the second signal based on a mode selection signal.

21. The system of claim 20, wherein:
the signal generator circuit is configured to generate a signal representing an angular speed of the rotatable driving shaft based on the angular values; and
the mode selection circuit configured to receive the signal representing the angular speed of the rotatable driving shaft as a third signal, and output the first signal, the second signal, or the third signal based on the mode selection signal.

22. The system of claim 20, wherein the magnetic field sensor is configured to unambiguously sense the orientation angle of the magnetic field in the range from 0° to 360°.

23. The system of claim 20, wherein the electronic circuitry is further configured to generate, depending on the sensed orientation angle, a further signal which represents a rotation angle of the rotatable driving shaft in the range from 0° to 360°.

24. The system of claim 20, wherein the magnet is selected from the group comprising:
- a diametrically magnetized magnetic pill,
- a flat element radially extending with respect to an axis of the rotatable driving shaft, and
- a disc-shaped element forming a magnetic dipole, wherein one half of the disc forms the magnetic north pole and the other half of the disc forms the magnetic south pole.

* * * * *